United States Patent
McDonnell et al.

(10) Patent No.: US 7,308,604 B2
(45) Date of Patent: Dec. 11, 2007

(54) REAL-TIME FAIL-OVER RECOVERY FOR A MEDIA AREA NETWORK

(75) Inventors: Niall Seamus McDonnell, Portland, OR (US); David Aaron Crowther, Aloha, OR (US); Daniel Edwin Bame, Beaverton, OR (US); Robert Ray Wood, Gaston, OR (US)

(73) Assignee: Thomson Licensing, Boulogne Billancourt (FR)

( * ) Notice: Subject to any disclaimer, the term of this patent is extended or adjusted under 35 U.S.C. 154(b) by 73 days.

(21) Appl. No.: 10/522,973

(22) PCT Filed: Jul. 3, 2003

(86) PCT No.: PCT/US03/21059

§ 371 (c)(1),
(2), (4) Date: Feb. 1, 2005

(87) PCT Pub. No.: WO2004/013719

PCT Pub. Date: Feb. 12, 2004

(65) Prior Publication Data

US 2006/0090094 A1    Apr. 27, 2006

Related U.S. Application Data

(60) Provisional application No. 60/400,635, filed on Aug. 2, 2002.

(51) Int. Cl.
*G06F 11/00* (2006.01)

(52) U.S. Cl. ............................................. 714/9; 714/5

(58) Field of Classification Search ...................... 714/9
See application file for complete search history.

(56) References Cited

U.S. PATENT DOCUMENTS

| 5,790,775 A | 8/1998 | Marks et al. |
| 5,928,367 A | 7/1999 | Nelson et al. |
| 5,944,838 A | 8/1999 | Jantz |

(Continued)

FOREIGN PATENT DOCUMENTS

EP    0962864    12/1999

(Continued)

OTHER PUBLICATIONS

Microsoft Press Computer Dictionary Third Edition, "real-time", Microsoft Press, 1997, p. 399.*

(Continued)

*Primary Examiner*—Gabriel Chu
(74) *Attorney, Agent, or Firm*—Joseph J. Laks; Robert B. Levy

(57) ABSTRACT

A media area network includes a storage system having at least one storage device for storing digitized information. A host bus adapter provides a link between the storage system and a host system that provides overall control of the media area network. Within the host bus adapter, a lower-level port driver monitors communications between the storage system and the host bus adapter. In the event of a communications failure, the lower-level port driver initiates switching from a failed port to an alternative port, thereby achieving fail-over recovery. Allocating the responsibility for fail-over recovery to the lower-level port driver assures timely handling of port failures, thereby reducing potential latency delays.

1 Claim, 2 Drawing Sheets

U.S. PATENT DOCUMENTS

| | | |
|---|---|---|
| 6,006,342 A | 12/1999 | Beardsley et al. |
| 6,061,750 A | 5/2000 | Beardsley et al. |
| 6,128,750 A | 10/2000 | Espy et al. |
| 6,148,414 A | 11/2000 | Brown et al. |
| 6,154,850 A * | 11/2000 | Idleman et al. ................ 714/5 |
| 6,247,142 B1 | 6/2001 | Wong et al. |
| 6,449,731 B1 | 9/2002 | Frey, Jr. |
| 6,578,158 B1 | 6/2003 | Deitz et al. |
| 6,625,747 B1 | 9/2003 | Tawil et al. |
| 6,643,795 B1 | 11/2003 | Sicola et al. |
| 6,725,295 B2 * | 4/2004 | Iwatani ........................ 710/38 |
| 6,779,064 B2 * | 8/2004 | McGowen et al. ......... 710/104 |
| 6,944,785 B2 * | 9/2005 | Gadir et al. .................... 714/4 |
| 7,036,066 B2 * | 4/2006 | Weibel et al. ............... 714/752 |
| 2001/0020282 A1 | 9/2001 | Murotani et al. |
| 2002/0023151 A1 | 2/2002 | Iwatani |
| 2003/0126315 A1 * | 7/2003 | Tan et al. ...................... 710/1 |
| 2003/0172331 A1 * | 9/2003 | Cherian et al. ............. 714/712 |
| 2004/0078632 A1 * | 4/2004 | Infante et al. ................ 714/5 |

FOREIGN PATENT DOCUMENTS

| | | |
|---|---|---|
| WO | WO 02/19111 | 3/2002 |

OTHER PUBLICATIONS

"Media Area Network Service Solutions", Grass Valley Group, 2001 [http://www.thomsongrassvalley.com/docs/Fact-Sheets/service/SVC-011.pdf],all.

"Grass Valley Group Offers Industry's First No-Compromise Shared Storage Solution", Roscor.com,[http://www.roscor.com/Whatsnew/archive/grassvalley-sharedstorage.html].all.

Search Reported Dated Nov. 7, 2003.

European Search Report.

* cited by examiner

REAL-TIME FAIL-OVER RECOVERY FOR A MEDIA AREA NETWORK

CROSS REFERENCE TO RELATED APPLICATION

This application claims the benefit, under 35 U.S.C. § 365 of International Application PCT/US03/21059, filed Jul. 3, 2003, which was published in accordance with PCT Article 21(2) on Feb. 12, 2004 in English and which claims the benefit of U.S. Provisional patent application No. 60/400,635, filed Aug. 2, 2002.

TECHNICAL FIELD

This invention relates to a technique for achieving fail-over recovery of storage devices in a media area network.

BACKGROUND ART

Within the broadcast industry, there exist Media Area Networks (MANs) that comprise a host system, in the form of a central processor that executes a non-real time operating system. A host bus adapter links the host system to a storage system that includes one or more storage devices. Each device can take the form of a stand-alone disk or a Redundant Array of Inexpensive Disks (RAID). In practice, each storage device holds digitized video accessible for editing and/or broadcast. To assure reliability, all components within the MAN are fault tolerant and have redundant features in an effort to offer real time recovery in the event of a fault. Such real time recovery becomes especially critical when the video stored in one or more of the storage devices of the storage system undergoes live transmission.

When a fault occurs in a MAN, the location of the fault can affect the time required for recovery. For example, consider a fault associated with a port assigned to a storage device. Upon the occurrence of such a fault, an error signal propagates into a fibre channel fabric that carries the error signal to the host bus adapter. The host bus adapter typically has the capability the switching between the failed port and an alternative port to recover from the fault. Unfortunately, present-day host bus adapters do not inherently support the real-time requirements of a media area network. Existing host bus adapters usually introduce significant latencies. Delays of as much as 10 seconds can occur between receipt of an error and the switching between ports. Such delays impose significant difficulties. Some manufacturers of host bus adapters now provide fail-over recovery software that manages port failures. Unfortunately, such software has not proven to be either transparent or seamless. Empiric testing has revealed that such software incurs latency delays as much as 15 seconds.

Thus, there is need for a technique for providing near real time recovery of faults in a MAN.

BRIEF SUMMARY OF THE INVENTION

Briefly, in accordance with present principles, a Media Area Network (MAN) includes a host system, a storage system having at least one storage device, and a host bus adapter linking the host system to the storage system. Within the host bus adapter, a port driver monitors for the presence of one or more error signals generated by the storage system upon the occurrence of an error. In response to an error signal, the port driver automatically initiates switching between a failed port and an alternative port to accomplish fail-over recovery. Allocating the responsibility for fail-over recovery to the port driver assures timely handling of port failures, thereby reducing potential latency delays.

DETAILED DESCRIPTION

Figure 1:
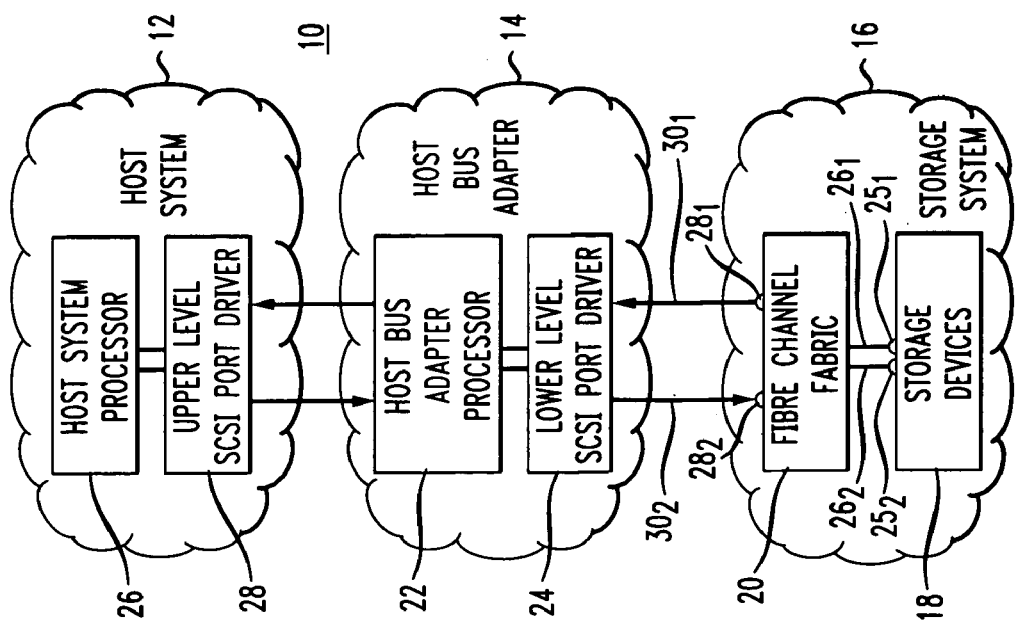
FIG. 1 depicts a block schematic diagram of a MAN that accomplishes real-time fail-over recovery in accordance with the present principles.

FIG. 1 depicts a block schematic diagram of an illustrative embodiment of a Media Area Network (MAN) 10 that includes a host system 12 linked by a host bus adapter 14 to a storage system 16. The storage system 16 includes one or more storage devices, exemplified by device 18. Each storage device 18 can take to form of an individual device, or a Redundant Array of Inexpensive Disks (RAID). Each storage device 18 has the capacity to store large volumes of digitized information, such as digitized video, either in compressed or uncompressed form. Within the storage system 16, a fibre channel fabric 20 couples each storage device 18 to the host bus adapter 14. The fibre channel fabric 20 typically takes the form of a one or more conventional fibre channel switches and associated links (not shown).

The host bus adapter 14 provides a switchable path between the host system 12 and the storage system 16. To that end, the host bus adapter 14 includes a real-time kernel 22 in the form of a processor running a real time operating system, such as the VxWorks™ operating system available from Wind River Systems, Inc., Alameda, Calif., although other real-time operating systems exist and can readily be employed. The real-time kernel 22 controls a lower-level Small Computer Systems Interface (SCSI) interface port driver 24 that provides real-time fail-over recovery functionality in accordance with the present principles. In particular, the lower-level port driver 24 includes logic (either in the form of dedicated circuitry or a programmable processor) for monitoring the status of individual ports $25_1$ and $25_2$ and associated links $26_1$ and $26_2$ that carry information to and from the storage system 16. To assure redundancy, each storage device 18 maintains a connection to the host bus adapter 14 through dual links and dual ports. One of the ports (e.g., $25_1$) and its associated link (e.g., $26_1$) serves as an alternate while the other port (e.g., $25_2$) and associated link (e.g., $26_2$) remain active. In the event of a failure (e.g., the failure of a previously active port and/or its associated link), the lower-level port driver 24 switches to the alternate port (and its associated link) to achieve fail-over recovery. As described in greater detail with respect to FIGS. 2 and 3, the lower-level port driver 24 thus performs the decision-making associated with the port switching (as well as the decision making concerning activating a redundant storage device and/or device controller). Accordingly, the lower level port controller 24 relieves the host system 12 of this responsibility, which reduces latency delays. The lower-level port driver 24 also serves to facilitate communications for SCSI I/O traffic through the fibre channel fabric 20.

In the illustrated embodiment of the MAN 10 in FIG. 1, the host bus adapter 14 connects to the fibre channel fabric 20 via dual connections (i.e. two links $30_1$ and $30_2$ and two ports $28_1$ and $28_2$, respectively, per channel). The storage system 18 likewise connects to the fibre channel fabric 20 via two connections (ports $25_1$ and $25_2$) per RAID chassis. In this way, either of the two host ports can communicate with either of two RAID controllers (not shown) per RAID chassis. This allows for independent fail-over between the ports and the two RAID controllers. Each host port can use either RAID controller in a RAID chassis. In the event of a failure, host port switching can occur without switching RAID controllers and RAID controller switching can occur without switching host ports.

The host system 12 provides overall control of the MAN 10 via a non-real time kernel 26 that takes the form of a processor executing a non-real time operating system, such the Windows® operating system from Microsoft Corporation, Redmond, Wash., the Solaris® operating system from Sun Microsystems, Santa Clara, Calif., or the Linux operating system. The non-real time kernel 26 communicates with the host bus adapter 14 via a messaging technique, rather than a direct connection with each storage device 18, to manage the communication of information between the storage system 16 and the host system 12.

Figure 2:
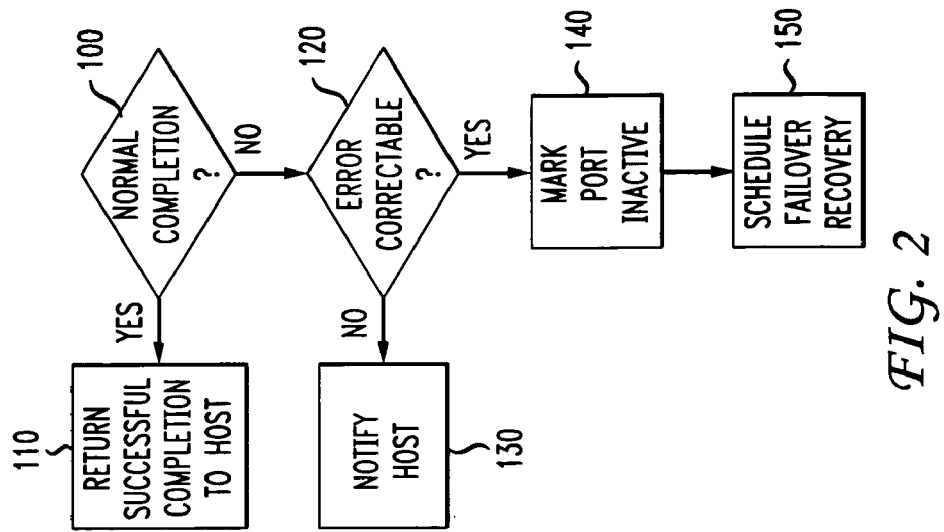
FIG. 2 depicts a flow chart representation of the steps executed to perform the task of 25 servicing an interrupt generated by storage device in the MAN of FIG. 1.

FIG. 2 illustrates a flow-chart that depicts the steps of a method executed by the lower-level port driver 24 of FIG. 1 to accomplish the task of servicing an interrupt generated by the storage device 18 in the storage system 16 of FIG. 1. The task of servicing an interrupt commences upon execution of step 100 during which the lower-level port driver 24 checks whether the storage device 18 of FIG. 1 completed a command in a normal manner. If so, then the lower-level port driver 24 will advise the host system 12 of FIG. 1 of the successful completion of that command during step 110 of FIG. 2. Following unsuccessful execution of a storage system command during step 100, a check occurs during step 120 whether the error is correctable. In other words, the lower-level port driver 24 determines whether the error that occurred can be corrected by switching to an alternate port or controller. Upon determining that no corrective action exists, the host system 12 of FIG. 1 receives a notification to that effect during step 130 of FIG. 2. In the event of a correctable error, the lower-level port driver 24 proceeds to mark the port (not shown) associated with the storage device that generated the error as inactive during step 140 of FIG. 2. Thereafter, the lower-level port driver 24 schedules the task of fail-over recovery (i.e., the task of selecting an alternative port) during step 150 of FIG. 2.

Figure 3:
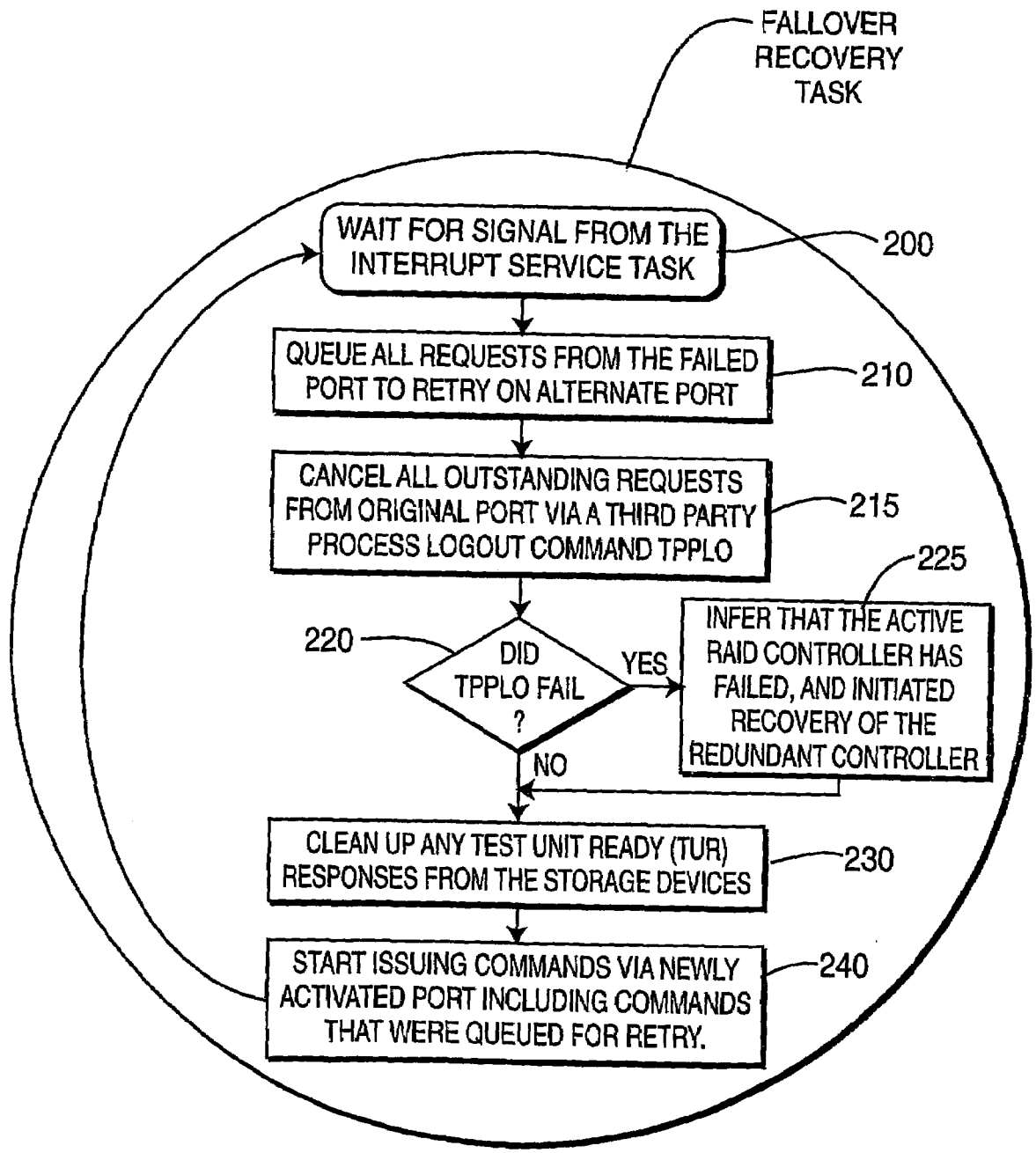
FIG. 3 depicts a flow chart representation of the steps executed to perform real time fail-over recovery after detecting certain types of errors during the task of servicing an interrupt depicted in FIG. 2.

FIG. 3 illustrates a flow chart that depicts the steps of the task of fail-over recovery performed by the lower-level port driver 24 of FIG. 1. The task of fail-over recovery commences upon execution of step 200 of FIG. 3 during which the lower-level port driver 24 waits for a signal from the interrupt task of FIG. 2 indicating that the task of fail-over recovery should occur. Upon finding that the task of fail-over recovery has now become active, the lower-level port driver 24 of FIG. 1 places all requests from the inactive (i.e., failed) port in a queue during step 210 of FIG. 3. Thereafter, the lower-level port driver 24 cancels all outstanding requests from the original, but now inactive port during step 215 of FIG. 3, typically by way of a Third Party Process Log Out (TPPLO) command. Next, a check is made during step 220 of FIG. 3 whether the TPPLO command failed. Upon detecting a failure of the TPPLO command during step 220, the lower-level port driver 24 of FIG. 1 makes an inference during step 225 that the controller (not shown) associated with the storage device 18, (typically a RAID controller) failed or the path associated with the controller failed. Under such circumstances, the lower-level port driver 24 of FIG. 1 will initiate recovery by actuating a redundant RAID controller.

Following step 225 (or step 220 when the TPPLO command did not fail), the lower-level port controller 24 of FIG. 1 completes (i.e., "cleans up") any existing Test Unit Ready (TUR) responses from any of the storage devices 18 during step 230 of FIG. 3. Finally, the lower-level port controller 24 begins issuing commands through the newly activated alternate port during step 240, including commands previously queued for retry during step 210. Thereafter, program execution branches back to step 200 to await the recovery task.

The foregoing describes a technique for achieving fail-over recovery of storage devices in a media area network by having a lower-level port driver 24 monitor for a failed (inactive) port and then switch to an alternative port to effect recovery.

The invention claimed is:

1. A method for achieving fail-over recovery in a media area network having a storage system with at least one storage device for storing digitized information, a host system for providing overall control of the media area network; and a host bus adapter for providing a link between the host system and the storage system, the method comprising the steps of
    monitoring, at a lower-level port driver in the host bus adapter, communication status between the storage system and the host bus adapter, and in the event of a failure;
    checking whether cancellation of the outstanding commands occurred, and if not then initiating fail-over recovery of any failed storage system controller;
    initiating switching at the lower-level port driver to activate an alternative port, thereby achieving fail-over recovery, including the steps of:
    queuing requests from an original port that failed for retry on the alternative port;
    canceling all outstanding requests on the original port; and
    issuing commands via the alternative port, including commands associated with the requests previously queued for retry.

* * * * *